Patented Nov. 27, 1934

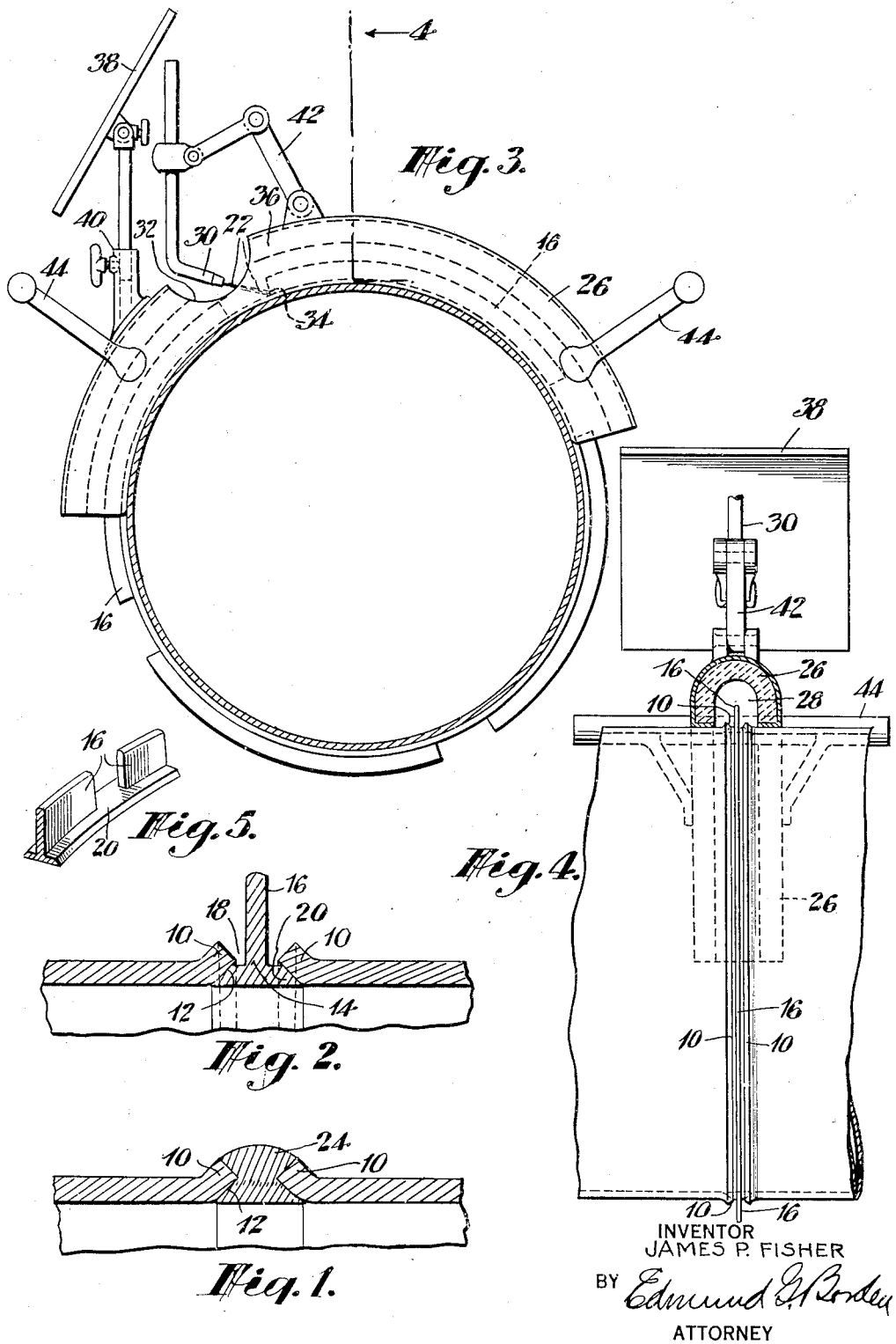

1,981,850

UNITED STATES PATENT OFFICE 1,981,850

PIPE WELDING

James P. Fisher, Bartlesville, Okla., assignor to Doherty Research Company, New York, N. Y., a corporation of Delaware Application June 1, 1931, Serial No. 541,235

6 Claims. (Cl. 113—112)

This invention relates to pipe joints and more particularly to an improved design of pipe joint and to an improved method of and apparatus for forming welded pipe joints.

In forming the butt joints between pipes by acetylene welding during the field construction of pipe line systems, the general practice is substantially as follows:—Pipe having been strung along the right of way, the adjoining ends of adjacent pipe are supported on wooden skids in co-axial alignment and spaced the proper distance to allow welding of a suitable joint. For example pipes of $\tfrac{5}{16}$ inch wall thickness and 16 inches diameter are normally spaced from $\tfrac{3}{16}$ inch to $\tfrac{1}{4}$ inch apart preparatory to tack welding them together. The tack welding is done by two welders both working on the pipe joint simultaneously at points 180° apart, each making a light tack weld about 2 inches long whereby the pipes are firmly joined and held together end to end. The tack welds are placed simultaneously on opposite sides of the pipe in order that the contraction of the welds on cooling may not throw the pipe out of alignment. The shrinkage of these tack welds is such that the spacing between the pipe ends is substantially $\tfrac{1}{16}$ inch less after the tack welding operation than it was before the tack welding takes place.

In pipe line construction as many pipes as the character of the ground permits are thus fastened together by tack welding after which the permanent welds are made by what is known as the rolling weld method. According to the rolling method of making permanent welds one welder is stationed at each joint to be welded with the necessary equipment including torch and welding rod available. All the welders then start welding the joints simultaneously and in the same relative longitudinal position along the pipes, each forming a fused starting puddle and continuing to weld from such puddle around the entire seam. As welding proceeds, the entire length of pipe is gradually turned so that the welding operation is carried on near the top portion of the pipe at all times. After the welding has been carried completely around the pipe the cool portion of the original weld is refused and the joint is reheated for a considerable distance beyond the original starting point of the weld. This reheating is done in order to prevent development of severe shrinkage strains which would otherwise occur if the molten finished puddle of the weld were left to cool adjacent a cold starting portion of the weld. Another precaution found necessary in forming the permanent welds is to fuse out the tack welds as they are encountered in the permanent welding operation and re-weld clear to the base of the V-shaped space which is usually provided between the pipe ends. Experience shows that it takes approximately 50 minutes on the average to complete a permanent weld on 16 inch pipe of $\tfrac{5}{16}$ inch wall thickness.

Test sections or coupons cut from permanent pipe joints made as outlined above vary widely in strength and in weld penetration. (By weld penetration is meant the percentage of area of the pipe ends forming the joint in which the fusion action was complete during the welding operation.) The optimum weld penetration of 100% extending through the entire thickness of the pipe ends is far too seldom obtained. Test coupons cut from complete pipe systems will normally show weld penetrations ranging from 70 to 100%. Weld penetrations under 70% are usually caught on inspection and such defective welds are fused out and new weld joints substituted.

Test coupons showing upwards of 95% weld penetration almost always exhibit close to 100% strength efficiency when placed under load in a tensile testing machine. Such full penetration welds will usually develop the full strength of pipes joined by the weld, and if failure occurs it will normally be in the metal of the pipe rather than in the weld. In weld joints having a penetration less than 90%, the pipe joint will normally fail at the weld, and the efficiency of the weld under tension load will be considerably less than 100%.

The efficiency under tension of a normally good weld having upwards of 95% penetration should always be at least 85% or better. As the efficiency of the weld under tension load drops substantially below 100%, the elongation coefficient of the weld drops considerably below the corresponding coefficient of the pipe and the weld on fracture exhibits a coarse and crystalline structure.

The principal cause of defective welds and welds of low penetration and correspondingly low efficiency is in the difficulty of obtaining uniformly perfect welds inherent in an operation where the results are so largely dependent on the uniform skill and reliability of the welder or operator, and wherein so many variable factors such as weather and torch temperatures affect to a very great degree the character of the results.

Objects of the present invention are:—to provide an improved design of welded pipe joint of uniformly high penetration and efficiency and low cost; to provide method and apparatus for making pipe joints whereby joints of uniformly high efficiency can be produced in a much shorter time than has been heretofore possible; and to provide method and apparatus for making an improved pipe joint by means of which any operator of normal skill and experience can complete a uniformly efficient joint of substantially 100% efficiency in a fraction of the time and with much less discomfort and inconvenience than has been possible prior to the development of the present invention.

With the above and other objects and features in view the invention consists in the improved pipe joint and method and apparatus for making same which is hereinafter described and particularly defined in the claims.

The various features of the invention are illustrated more or less diagrammatically in the accompanying drawing, in which:

Fig. 1 is a sectional side view of part of the preferred pipe joint of the present invention in its completed form, having a weld head substantially flush with the inside wall of the pipe.

Fig. 2 is another sectional view illustrating the manner in which the elements forming the joint of Fig. 1 are assembled preparatory to welding;

Fig. 3 is a cross-sectional view taken through the pipe showing in elevation some of the elements which form the joint assembled preparatory to welding, and also showing in elevation the preferred form of welding apparatus used in forming the joint;

Fig. 4 is a cross-section through the shield member of the welding apparatus of Fig. 3, taken on the line 4—4, and showing in plan the elements which go to make up the joint assembled preparatory to welding; and Fig. 5 is a perspective view of a section of the weld metal ring with its split central web.

Having reference to the accompanying drawing and particularly to Fig. 2, it will be seen that the first step in forming the preferred joint of the present invention consists in flaring out the ends 10 of the pipe to be joined so that they form an angle of substantially 45° with the axis of the pipe. This flaring operation leaves the adjoining ends of the adjacent pipe with their faces in planes intersecting at a substantially 90° angle. As the ends of the two pipes are brought together in co-axial alignment, an inverted V-shaped space 12 is formed between the inside walls of the adjacent flared ends of the pipe, and into this space there is inserted a guard ring 14 of weld metal having an internal diameter substantially equal to the internal diameter of the adjacent pipe. The ring 14 has a substantially inverted T-shaped cross section with a central web 16 adapted to project outwardly through the V-shaped space 18 separating the pipe ends when the pipe ends are drawn together so as to form a fairly tight fit with ring 14 in place. It will be seen that the edges of the head portion 20 of the ring are beveled so as to insure a fairly tight fit of the ring in the inverted V-shaped space 12. The ring 14 may be constructed of the welding iron or steel commonly used in welding rod, and can be drawn or rolled to the T-bar section illustrated and then bent and its ends welded together to form rings of inner circumference corresponding to the inner circumference of the pipe to be welded. At 90° spaced points on the circumference of the ring a small section of the web 16 (2 inches long in the case of rings for large pipe) should be cut away, or else the web should be rolled in spaced sections of corresponding length so as to provide convenient places on the welding side of the ring for making tack welds.

In welding the joint illustrated after tacking the ring 14 and pipe ends 10 in place as shown in Fig. 2, the preferred method of operation is to apply the flame 22 of the torch to the base of the web 16 where it joints the body part 14 of the ring at the end of one of the tack welds, (see Fig. 3), thus fusing metal from the web 16 down into the ring and into the adjoining ends 10 of the pipe. At this one point sufficient welding material is added from a welding rod so as to build up a bead of the desired height. As the weld proceeds the flame is directed well down to the base of the web 16 fusing fairly deeply into the head 14 of the ring, and sufficient heat is carried by conduction and by convection of the escaping gases to the web portion 16 of the ring and to the adjoining ends 10 of the pipe so that the web 16 is gradually fused and the resulting metal is run down into the joint to form a bead 24 of roughly elliptical cross-section and 100% penetration between the body 14 of the ring and the ends 10 of the adjacent pipe (see Fig. 1).

The web 16 of the ring is originally dimensioned with exactly the right amount of metal to form a proper bead and a weld of 100% strength and penetration, so that the proper amount of metal and strength of weld is insured independently of the skill or ideas of the welder. The dimensions of the ring 14 are proportioned in accordance with the thickness of the adjoining pipe ends 10 so that heat is carried away from the hot weld at a uniformly predetermined rate calculated to insure a weld having complete penetration and 100% strength, with substantially no opportunity afforded for formation of an inadequately fused or plastered weld. By thus insuring the use of the proper amount of welding material and of the proper place and rate of heat application by means of the joint design independently of the skill of the operator and other variable factors, the amount of inspection required is limited to seeing that the welder operates at the proper rate and that his torch is directed to the proper point in the weld.

The improved joint and method of making same having been thus described, the preferred welding apparatus illustrated in Fig. 3 will next be considered. This improved welding apparatus is designed to materially increase the efficiency and decrease the hardship and discomfort of the welding operation. In the conventional welding operation as now practised the amount of heat which is used in fusing the metal is a very small proportion of the total amount of heat developed by the welding torch. The greater part of the heat developed is lost in the form of radiation and conduction to the cold portion of the pipe, and as sensible heat in the gases which are released by the welding torch at a very high temperature. This operation is wasteful and works a great hardship on the welding operators as the heat leaving the weld makes it very difficult for them to endure the work, particularly in hot summer weather.

The preferred welding apparatus of the present invention, as it is illustrated in Figs. 3 and 4, incorporates as its principal element a refractory shield 26. Shield 26 is semi-ring shaped in side elevation and has a hollow core 28. In cross-section it has an inverted U-shape. Shield 26 closely resembles in design a portion of an automobile casing, except that for use in welding pipes having dimensions corresponding with the rim dimensions of an automobile tire, the shield 26 has a cross-sectional area considerably larger than the cross-sectional area of a normal tire casing of the same curvature.

In use, the shield 26 is mounted as illustrated so as to straddle the pipe joint with the inner rim of the shield substantially conforming in contour with the outer circumference of the pipe and engaging or closely paralleling the circumference of each pipe joint behind the flared end of the pipe which is to form the joint. The shield 26, when mounted in place as illustrated, forms with the ends of the adjacent pipe comprising the joint a gas removal flue through which a large part of the hot gases produced by the welding torch 20 is conducted away from the hot weld bead in contact with the unwelded and previously welded portions of the joint in both directions from the point at which the torch is applied. The shield 26 also serves as a partial cover for the hot freshly welded portion of the joint, so that a substantial portion of the heat radiated by the torch flame and by the incandescent metal in the weld is absorbed by the shield and reradiated back on the joint adjacent the weld by the interior surface of the shield. Also a considerable portion of the sensible heat of the gases carried away from the weld by the shield is transferred to the metal in the unwelded portions of the joint, thereby preheating the joint parts prior to the actual welding operation. The shield 26 also covers up a substantial portion of the weld already made, and thereby retards the rate of cooling of this portion and acts to maintain a substantial part of the entire circumference of the finished weld at a high temperature until the joint has been completely welded, thus lessening materially, if not eliminating, the difficulties encountered in normal welding practice from the development of severe temperature strains. Another useful function of the shield 26 is that of directing a considerable part of the heat developed by the torch back to the metal forming the joint instead of allowing it to radiate directly into the face of the welder or operator, thus protecting his face and lungs from the hot torch gases and thereby materially increasing the welder's comfort, health, and efficiency.

In order to permit ready manipulation of the welding torch and allow a complete inspection of the welding operation, a small portion 32 of the shield is cut away as illustrated. This cutaway portion 32 of the shield is made as small as the purposes for which it is provided allow, and the loss of heat by radiation and escape of hot gases through this cut-away opening is not as great as might be expected because, as shown in Fig. 3, the high temperature welding zone 34 is located beneath the shield at a point 36 located somewhat in advance of the cut-away portion 32, and the flames from the torch are largely carried away from the shield in clockwise direction to the uncompleted portion of the weld by the jet effect of the torch flame as it is directed away from the weld and toward the unwelded portions of the joint.

In order to afford protection for the eyes and face of the welder from the glare and heat of the welding torch, a colored glass screen 38 is adjustably mounted on a pedestal 40 attached to the outer circumference of the shield 26 as illustrated. The provision of this color screen enables the welder to operate without the use of eye goggles and with much less discomfort, in hot weather particularly, than is possible without the shield and screen. As shown in the drawing, the welder's torch 30 is also adjustably mounted on a pedestal 42 attached to the outer circumference of the shield 26, so that the torch can be readily mounted in proper position and its weight thereafter carried by the mounting, relieving the operator from the strain of holding the torch. After the torch is once properly set, all that the welder has to do is to inspect the welding operation and if necessary, rotate the shield around the joint by means of handles 44 at a proper rate to satisfactorily complete the joint. Normally the welder does not even have to move the shield but need only hold it in stationary position while the pipe is rolled as in conventional practice at the rate controlled by the operation. The supporting connection between pedestal 42 and torch 30 may be efficiently flexible to permit of a small degree of oscillatory or rotatory movement of the torch in use while at the same time supporting the weight of the torch and holding it in the proper general position with respect to the weld.

By means of a weld joint and of a welding apparatus of the class described, the conventional pipe welding practices are very materially simplified and improved. By virtue of the heat conservation afforded by both the welding apparatus and by the design of the elements which make up the joint, a completely efficient weld can be made with a very much smaller welding flame and with the use of a very much smaller and uniform weight of weld metal. More highly efficient and complete penetration and uniform results are practically insured on all welds because both the new joint design and the new welding apparatus contribute to greatly increased comfort and efficiency for the operator, greatly decreased dependence on the skill and ideas of the operator, and a minimum variation in results occasioned by such variable factors as weather and temperature changes and welding metal and torch application. The design of the joint elements and of the welding apparatus also both contribute to a greatly increased efficiency in application of heat and marked reduction in the time required for completing a weld of a pipe joint, with the result that the fuel, labor, and metal requirements for completing a given weld are all markedly reduced. Experience indicates that a weld averaging much higher in penetration and efficiency can be completed by means of the improved joint and welding apparatus of the present invention in one quarter of the time, and by the use of very much less fuel and welding material than is required according to the conventional methods of welding butt joints referred to in the introductory part of this description.

Moreover the strength and density of a joint completed by the present process can be depended upon, which is not the case with joints made by the conventional welding methods.

One of the principal advantageous features of the present joint and method of welding is that because of the completion of the weld in a few minutes (say 12½ minutes for a 16″ pipe) and because of the protection of the weld against substantial loss of heat until the whole joint is welded, and because of preheating the joint ahead of the welding part, the completed weld is made and is thereafter allowed to cool uniformly without the development of any localized temperature strains such as occur when some portions of the joint are cold while others are red hot. In other words, by the present invention any changes in temperature which take place around the joint are substantially uniform and gradual.

Another advantageous feature of the present pipe joint is that (as illustrated in Fig. 2), the finished weld viewed in cross-section is roughly elliptical and curves outwardly in both directions from the flared pipe ends, so that the weld is of considerably greater thickness than the pipe. Accordingly, even if a hot molten puddle should be left at a point in this weld with comparatively cold metal adjacent, the tendency to develop cracks from shrinkage strain would be very much less than with the conventional cylindrical welded butt joint. In the conventional butt joint the weld metal can contract freely in a circumferential direction because of the pipe curvature, but in contracting in a direction longitudinally of the pipe the metal of the weld is thrown in tension, while the adjacent cold metal in the joint surrounding the weld is under compression. Thus, as noted previously, the tack welds in cooling contract sufficiently to shorten the distance between the large pipe ends as much as $\frac{1}{16}''$ of 25%, and the large finishing puddles of the permanent weld which exist originally at even higher temperatures on contraction may reduce the distance between pipe ends at least $\frac{1}{8}$ of an inch of 50%. Since the pipe structure is stiff, all of this temperature effect is converted into stressing of the metal and the development of strains and unsound joints. Since the effective width of the hot portion of a permanent weld puddle is as much as 1", a shrinkage of $\frac{1}{8}''$ is equivalent to an elongation of 12½ per cent. Such an elongation is quite commonly more than enough to develop cracks. On the other hand, a flared pipe and guard ring weld of the type shown in Fig. 2 has a cross-section such that the $\frac{1}{8}''$ contraction of the puddle part of the weld is accommodated by a slight bending down of the flared portion of the pipe, and no part of the weld or of the pipe metal is greatly disturbed or strained. It is therefore clear that aside from the special welding apparatus and temperature control features of the present invention, the novel design of joint is itself such that the development of serious temperature strains in the metal of the joint is impossible.

The invention have been thus described, what is claimed as new is:

1. In forming a strong welded joint between the adjoining ends of two coaxially aligned cylindrical tubular bodies, the improvement which comprises expanding adjoining ends of said tubes outwardly in the shape of a funnel with the walls of the expanded section lying at a substantially 45° angle with the longitudinal axis of the tubes, and placing the thus funnel shaped ends in opposing closely spaced relation, fitting a weld metal ring of T-section and internal diameter corresponding with that of the tube in inverted position tightly into the inverted V-shaped groove formed at the joint between the funnel shaped walls of the tube ends with its central web extending outwardly in substantially abutting relationship with the spaced tube ends, and directing a welding flame against the base of said web and thereby fusing the metal of said web into a bead joining the ends of said tubes and the head of said ring.

2. The method of forming pipe joints comprising, expanding the ends of a pair of pipes outwardly so that the walls of the expanded section lie at a substantially 45° angle to the longitudinal axis, bringing the thus flared ends together in closely spaced coaxial alignment to form a groove of inverted V-section at the inner circumference of the joint between the inner walls of the pipe ends, inserting into said groove a weld metal ring of inverted T-section with the edges of its head beveled so as to substantially fill the groove and with the central web of the ring extending outwardly between the pipe ends, and forming a weld joint between the pipe ends and the body of the ring by fusing the central web of the ring deeply into the ring body and into the adjoining pipe ends in a manner such as to build up a weld bead of substantially elliptical cross section.

3. Pipe joint welding apparatus comprising a low heat conductant refractory shield of inverted U-section and semi-ring shaped elevation dimensioned to partially encircle and straddle a pipe joint and form therewith a flue for conducting hot gases away from the hot welding zone and in contact with cooler unwelded portions of the joint, a welding torch adjustably mounted on the shield in position to deliver a welding flame, handles mounted on the shield for adjusting the position thereof, and an operator's glass screen adjustably mounted on the outer periphery of the shield.

4. In pipe joint welding apparatus, a low heat conductant refractory shield having substantially the inverted U-section of an automobile tire casing with its rim dimensioned to closely fit and conform with the curvature of the pipe to be joined, said shield being adapted to partially encircle and straddle a pipe joint so as to form therewith a flue for conducting hot gases developed in the welding operation in contact with the cooler portions of the joint and to substantially reduce loss of heat by radiation from the zone of the welding operation.

5. In pipe joint welding apparatus, a heat absorbing and deflecting refractory shield of inverted U-section and semi-ring shaped elevation with its inner rim dimensioned to closely fit and conform in contour with the outer wall of the pipe to be joined, said shield being adapted to partially encircle and straddle a pipe joint and to form therewith a flue for conducting hot gas away from the welding zone in contact with cooler portions of the joint, and an opening in the outer wall of said shield intermediate its ends dimensioned to accommodate a welding torch and afford visual inspection of the welding operation.

6. The method of forming pipe joints comprising, flaring the walls adjacent adjoining ends of a pair of pipes outwardly at a 45° angle to the longitudinal axis, bringing the thus flared end walls in closely spaced coaxial alignment, fitting a weld metal ring of inverted T section and having the same inside diameter as the pipe into the groove of inverted V-shaped section between the flared inner walls of the pipe ends with its central web extending outwardly between the pipe ends, and forming a weld joining the pipe ends and the head portion of the ring by fusing the central web portion of the ring deeply into the main body of the ring and into the adjoining pipe ends.

JAMES P. FISHER.